(12) United States Patent
Banerjee et al.

(10) Patent No.: US 10,397,140 B2
(45) Date of Patent: Aug. 27, 2019

(54) MULTI-PROCESSOR COMPUTING SYSTEMS

(71) Applicant: HEWLETT-PACKARD DEVELOPMENT COMPANY, L.P., Houston, TX (US)

(72) Inventors: Deb Rupam Banerjee, Bangalore (IN); Thomas Wyatt, Barcelona (ES); Topuri Brahmaiah, Bangalore (IN); Lakshmi V, Bangalore (IN)

(73) Assignee: Hewlett-Packard Development Company, L.P., Spring, TX (US)

( * ) Notice: Subject to any disclaimer, the term of this patent is extended or adjusted under 35 U.S.C. 154(b) by 124 days.

(21) Appl. No.: 15/546,340

(22) PCT Filed: Jun. 25, 2015

(86) PCT No.: PCT/US2015/037599
§ 371 (c)(1),
(2) Date: Jul. 26, 2017

(87) PCT Pub. No.: WO2016/171739
PCT Pub. Date: Oct. 27, 2016

(65) Prior Publication Data
US 2018/0026916 A1    Jan. 25, 2018

(30) Foreign Application Priority Data
Apr. 23, 2015    (IN) .......................... 2093/CHE/2015

(51) Int. Cl.
*G06F 12/08*    (2016.01)
*H04L 12/935*    (2013.01)
(Continued)

(52) U.S. Cl.
CPC .......... *H04L 49/3036* (2013.01); *H04L 47/30* (2013.01); *H04L 49/901* (2013.01); *H04L 49/9021* (2013.01)

(58) Field of Classification Search
CPC ............ B60W 50/14; B60W 2050/143; G05D 1/0061; G05D 2201/0213; G06F 1/26
See application file for complete search history.

(56) References Cited

U.S. PATENT DOCUMENTS 7,464,174 B1    12/2008 Ngai
7,502,870 B1    3/2009 Chu
(Continued)

FOREIGN PATENT DOCUMENTS

WO    WO-1999027456    6/1999
WO    WO-2012143942    10/2012

OTHER PUBLICATIONS

Wu, W. et al; "A Transport-Friendly NIC for Milticore/Multiprocessor Systems"; Jan. 12, 2010; http://arxiv.org/ftp/arxiv/papers/1106/1106.0445.pdf.

*Primary Examiner* — Lan-Huong Truong
(74) *Attorney, Agent, or Firm* — HP Inc. Patent Department

(57) ABSTRACT

A multi-processor computing system comprising a second processing device to generate outgoing data packets and comprising a second network stack to save the outgoing data packets in a second outgoing packet buffer of the second processing device. A second network driver to save an outgoing buffer pointer in a second transmission ring of the second processing device, the outgoing buffer pointer corresponding to the second outgoing packet buffer. A first processing device comprising a first network driver to move the outgoing buffer pointer from the second transmission ring to a send ring in the first processing device. A network interface controller (NIC) to obtain the outgoing buffer
(Continued)

pointer from the send ring. The NIC to copy the outgoing data packets from the second outgoing packet buffer to a transmission queue of the NIC. The NIC to transmit the outgoing data packets to another computing system over a communication network.

20 Claims, 5 Drawing Sheets

(51) Int. Cl.
*H04L 12/835* (2013.01)
*H04L 12/883* (2013.01)
*H04L 12/879* (2013.01)

(56) References Cited

U.S. PATENT DOCUMENTS

| | | |
|---|---|---|
| 8,346,884 B2 | 1/2013 | Pettey |
| 2007/0162619 A1 | 7/2007 | Aloni et al. |
| 2009/0323690 A1* | 12/2009 | Lu .................. H04L 47/125 370/392 |
| 2011/0219145 A1 | 9/2011 | Pope et al. |
| 2011/0314469 A1 | 12/2011 | Qian |
| 2013/0103871 A1 | 4/2013 | Domsch |

* cited by examiner

MULTI-PROCESSOR COMPUTING SYSTEMS

BACKGROUND

Multi-processor computing systems are computing systems having multiple processors. The multiple processors may either be associated with a single operating system or run individual operating systems for performing different tasks of the computing system. Further, each of the multiple processors interacts with peripheral devices connected to the computing system for performing their tasks. Examples of such peripheral devices include a network interface controller, an input device, and a display device.

BRIEF DESCRIPTION OF DRAWINGS

The detailed description is described with reference to the accompanying figures. It should be noted that the description and figures are merely example of the present subject matter and are not meant to represent the subject matter itself.

DETAILED DESCRIPTION

Figure 1:
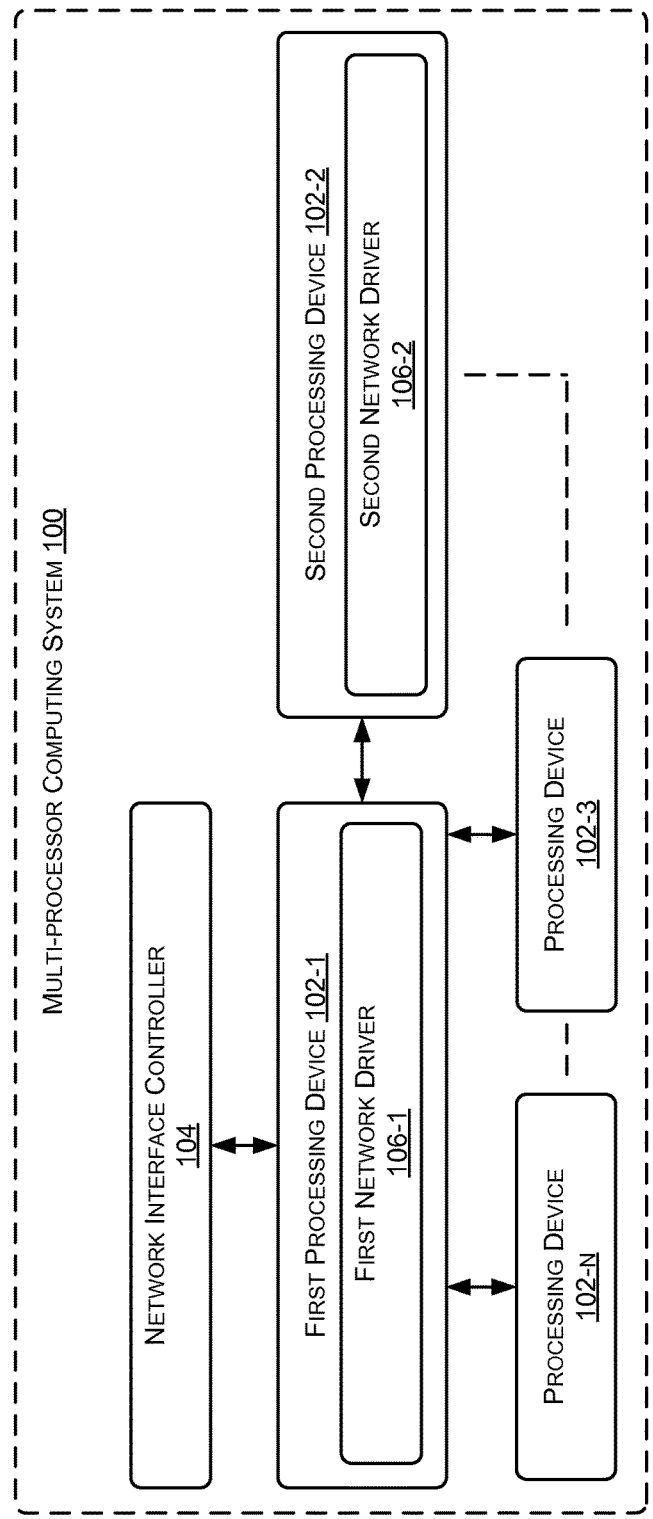
FIG. 1 illustrates a block diagram of a multi-processor computing system, according to an example of the present subject matter.

Network interface controllers (NIC) are peripheral devices used by computing systems for exchanging data packets with other computing systems over a communication network. The NIC generally interacts with a processing device of the computing systems to obtain outgoing data packets, i.e., data packets generated by the processing device for being transmitted over the communication network. Incoming data packets, i.e., data packets received over the communication network are also directed to the processing device by the NIC. The processing device generally uses a media access control (MAC) address of the NIC for interacting and sharing data packets with the NIC.

In case of multi-processor computing systems, i.e., computing systems having multiple processors, the NIC and other peripheral devices of the multi-processor computing systems are shared between the multiple processors. One of the approaches for sharing a single NIC between multiple processors includes creating a virtual NIC for each processing device. In such a case, each virtual NIC may have its own MAC address used by the corresponding processing device to interact with the virtual NIC. Using such a virtualized NIC architecture, however, may lead to loss of data, as the NIC may drop data packets received over the communication network if the data packets are addressed to a MAC address different from its own MAC address. In another example, the NIC may be operated in a mode to access and transfer all the data packets a hypervisor provided between the virtual NIC and the NIC for routing the data packets. Using such a hypervisor may, however, further increase processing load of the computing system.

Approaches for sharing an NIC in multi-processor computing systems are described. The present approaches facilitate in sharing the NIC such that a single MAC address and IP address can be used by multiple processing devices for exchanging data packets, thereby avoiding use of additional resources. As per an example of the present subject matter, a first processing device from among a plurality of processing devices is coupled to the NIC, while other processing devices are coupled to the first processing device. The first processing device facilitates exchange of data packets between the NIC and the other processing devices without utilizing any additional hardware or software routing units.

In accordance to an example of the present subject matter, when an incoming data packet is received over a communication network, the NIC saves the incoming data packets in a first incoming packet buffer of the first processing device. The NIC subsequently determines the processing device to which the incoming data packets belong, and moves an incoming buffer pointer to a receive ring corresponding to the processing device for which the incoming data packets are received. A "receive ring" is a queue for containing incoming buffer pointers for the processing device to which the receive ring belongs. In one example, receive rings corresponding to all processing devices are saved in the first processing device.

In case the incoming data packets belong to a processing device other than the first processing device, an incoming packet interrupt is generated to notify the processing device that incoming data packets are received. For, instance, if the incoming data packets are for a second processing device, then the incoming packet interrupt may be generated to notify the second processing device. A second network driver of the second processing device may access the receive ring to obtain the incoming buffer pointer and instruct a direct memory access (DMA) engine of the first processing device to copy the incoming data packets from the first incoming packet buffer to a second incoming packet buffer of the second processing device. The incoming data packets may then be processed by the second processing device.

In case the incoming data packets belong to the first processing device, a first network driver of the first processing device may access the receive ring to obtain the incoming buffer pointer for determining the location of the incoming data packets in the first incoming packet buffer. The incoming data packets may then be processed by the first processing device.

For outgoing transmission, when outgoing data packets are generated by the first processing device, a first network stack of the first processing device may save the outgoing data packets in a first outgoing packet buffer of the first processing device. The first network device may subsequently save an outgoing buffer pointer in a "send ring" present in the first processing device and inform the NIC that outgoing data packets are ready for transmission. The NIC may access the send ring to obtain the outgoing buffer pointer and subsequently copy the outgoing data packets for transmission to another computing system over the communication network.

When the outgoing data packets are generated by the second processing device, a second network stack of the first processing device may save the outgoing data packets in a second outgoing packet buffer of the second processing device. The second network device may subsequently save an outgoing buffer pointer in a transmission ring in the second processing device and invoke an interrupt for the first networking device to notify generation of the outgoing data packets. The first network device may subsequently access the transmission ring to obtain and save the outgoing buffer pointer in the send ring present in the first processing device and inform the NIC that outgoing data packets are ready for transmission. The NIC may access the send ring to obtain the outgoing buffer pointer and subsequently copy the outgoing data packets directly from the second outgoing packet buffer for transmission to the other computing system.

The present subject matter thus facilitates in sharing the NIC between a plurality of processing devices in a multi-processor computing system. As previously described, the NIC is communicatively coupled to a first processing device, while other processing devices are coupled to the first processing device for communicating with the NIC. The other processing devices save the outgoing data packets generated by them in an internal memory and share a location of the outgoing data packets with the first processing device for being communicated to the NIC. The NIC subsequently obtains the outgoing data packets directly from the processing device. Sharing the location instead of the data packets helps in reducing time and resources utilized for routing actual physical data packets through the first processing device.

Further, the NIC saves the incoming data packets in the first processing device, which in turn informs the other processing device about the receipt of the data packets. The other processing device subsequently obtains the incoming data packets from the first processing device, without establishing a connection with the NIC. Exchanging the data packets with the NIC without establishing a direct link helps in reducing time and resources utilized for data communication as any virtualizing of NIC or use of additional routers is avoided. Further, since all the processing devices are using the same MAC address and IP address, therefore neither the other computing systems nor the NIC has to maintain any MAC address list for determining the specific MAC addresses for each processing device while exchanging data packets with the multi-processor computing system.

The present subject matter is further described with reference to FIGS. 1 to 5. It should be noted that the description and figures merely illustrate principles of the present subject matter. It is thus understood that various arrangements may be devised that, although not explicitly described or shown herein, encompass the principles of the present subject matter. Moreover, all statements herein reciting principles, aspects, and examples of the present subject matter, as well as specific examples thereof, are intended to encompass equivalents thereof.

FIG. 1 illustrates a multi-processor computing system 100, according to an example of the present subject matter. The multi-processor computing system 100 may be implemented in, for example, desktop computers, multiprocessor systems, personal digital assistants (PDAs), laptops, network computers, cloud servers, minicomputers, mainframe computers, printing devices, scanning devices, and hand-held devices, such as tablets, storage-systems. The multi-processor computing system 100 includes a plurality of processing devices 102-1, 102-2, 102-3, . . . , 102-n, hereinafter collectively referred to as processing devices 102 and individually as processing device. The multi-processor computing system 100 further includes a network interface controller (NIC) 104 shared by the processing devices 102 for exchanging data packets with other computing systems (not shown in the figure) over a communication network. In one example, one of the processing devices, say, a first processing device 102-1 is communicatively coupled to the NIC 104, while the other processing devices 102-2, . . . , 102-n are communicatively coupled to the first processing device 102-1. As used herein, 'communicatively coupled' may mean a direct connection between entities in consideration to exchange data signals with each other via an electrical signal, electromagnetic signal, optical signal, etc. For example, entities that may either be directly communicatively connected with and/or collocated in/on a same device (e.g., a computer, a server, etc.) and communicatively connected to one another have been referred to as communicatively coupled with each other, hereinafter. Therefore, the computing resources communicating through a direct communication have been referred to be 'communicatively coupled' to each other.

Each of the processing devices 102 further includes a network device, for instance, the first processing device 102-1 includes a first network driver 106-1 and a second processing device 102-2 includes a second network driver 106-2. In operation, upon receiving an incoming data packet, the NIC 104 moves an incoming buffer pointer to a receive ring in the first processing device 102-1. In one example, the receive ring corresponds to a processing device 102, from among the plurality of processing devices 102, for which the incoming data packet is received. The incoming buffer pointer indicates a location of the incoming data packets saved in a first incoming packet buffer in the first processing device 102-1.

The first network driver 106-1 of the first processing device 102-1 then accesses the receive ring to identify the processing device 102 for which the incoming data packets have been received. If the incoming data packets are received for the first processing device 102-1, i.e., the processing device 102 is the first processing device 102-1 itself, then the first network driver 106-1 invokes an obtain packet task to obtain the incoming buffer pointer from the receive ring. The incoming buffer pointer may be further used to determine the location of the incoming data packets in the first incoming packet buffer for obtaining the incoming data packets for being processed by the first processing device 102-1

If the processing device 102 is a second processing device 102-2 and not the first processing device 102-1, the first network driver 106-1 transmits an interrupt generation command to an interrupt generation module of the first processing device 102-1. The interrupt generation module may notify receipt of the incoming data packets to the second processing device 102-2. A second network driver 106-2 of the second processing device 102-2 subsequently invokes an obtain packet task to obtain the incoming buffer pointer from the receive ring to determine the location of the incoming data packets in the first incoming packet buffer. The second network driver 106-2 further transmits an obtain packets signal to a direct memory access (DMA) engine of the first processing device 102-1 to copy the incoming data packets from the first incoming packet buffer to a second incoming packet buffer of the second processing device 102-2. The incoming data packets may then be processed by the second processing device 102-2.

Figure 2:
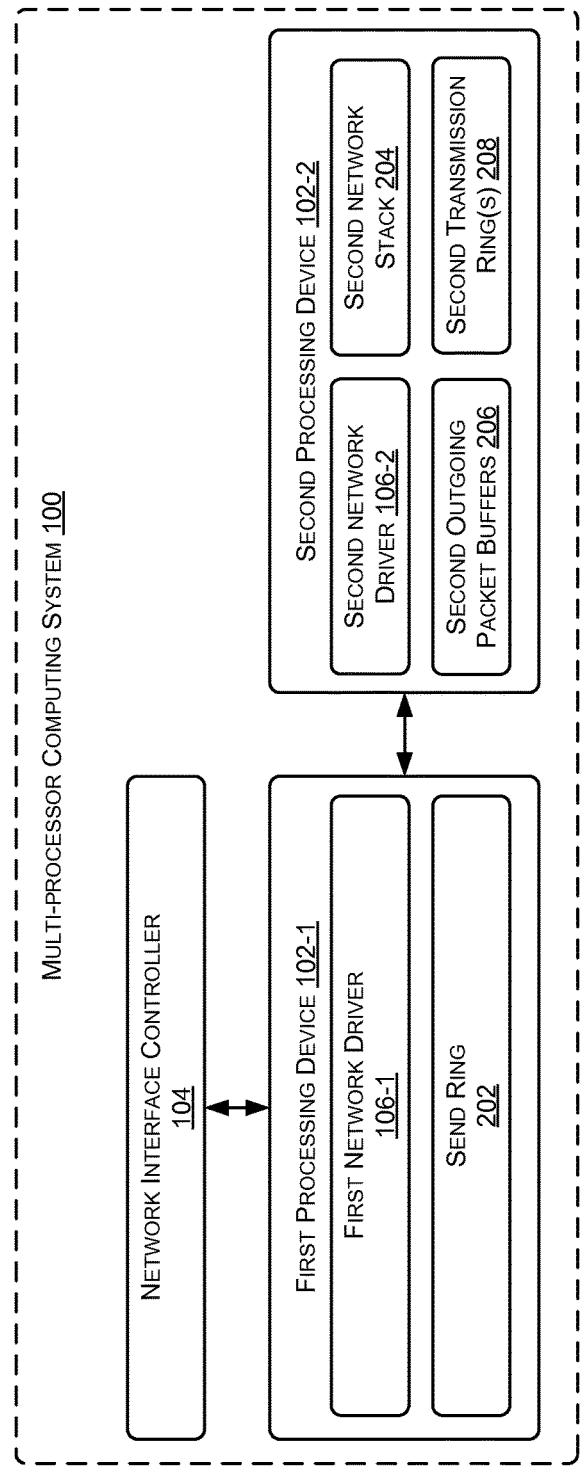
FIG. 2 illustrates a block diagram of a multi-processor computing system, according to another example of the present subject matter.

FIG. 2 illustrates the multi-processor computing system 100, according to another example of the present subject matter. As previously described, the multi-processor computing system 100 includes at least the first processing device 102-1 and the second processing device 102-2. As illustrated in the FIG. 2, the first processing device 102-1 is communicatively coupled to the NIC 104 and the second processing device 102-2 is communicatively coupled to the first processing device 102-1. In one example, the first processing device 102-1 includes the first network driver 106-1 and a send ring 202. The second processing device 102-2 includes the second network driver 106-2, a second network stack 204, a second outgoing packet buffers 206, and second transmission ring(s) 208.

In operation, once the second processing device 102-2 generates outgoing data packets, the second network stack 204 saves the outgoing data packets in the second outgoing packet buffers 206. The second network driver 106-2 subsequently saves an outgoing buffer pointer in the second transmission ring(s) 208 of the second processing device 102-2. In one example, the outgoing buffer pointer corresponds to the second outgoing packet buffers 206, i.e., the outgoing buffer pointer indicates a location of the second outgoing packet buffers 206.

Further, the first network driver 106-1 moves the outgoing buffer pointer from the second transmission ring(s) 208 to the send ring 202 in the first processing device 102-1. The outgoing buffer pointer is subsequently obtained by the NIC 104 from the send ring 202. The NIC 104 further copies the outgoing data packets from the second outgoing packet buffers 206 to a transmission queue of the NIC 104, using the outgoing buffer pointer. The NIC 104 may then transmit the outgoing data packets to another computing system over a communication network.

Figure 3:
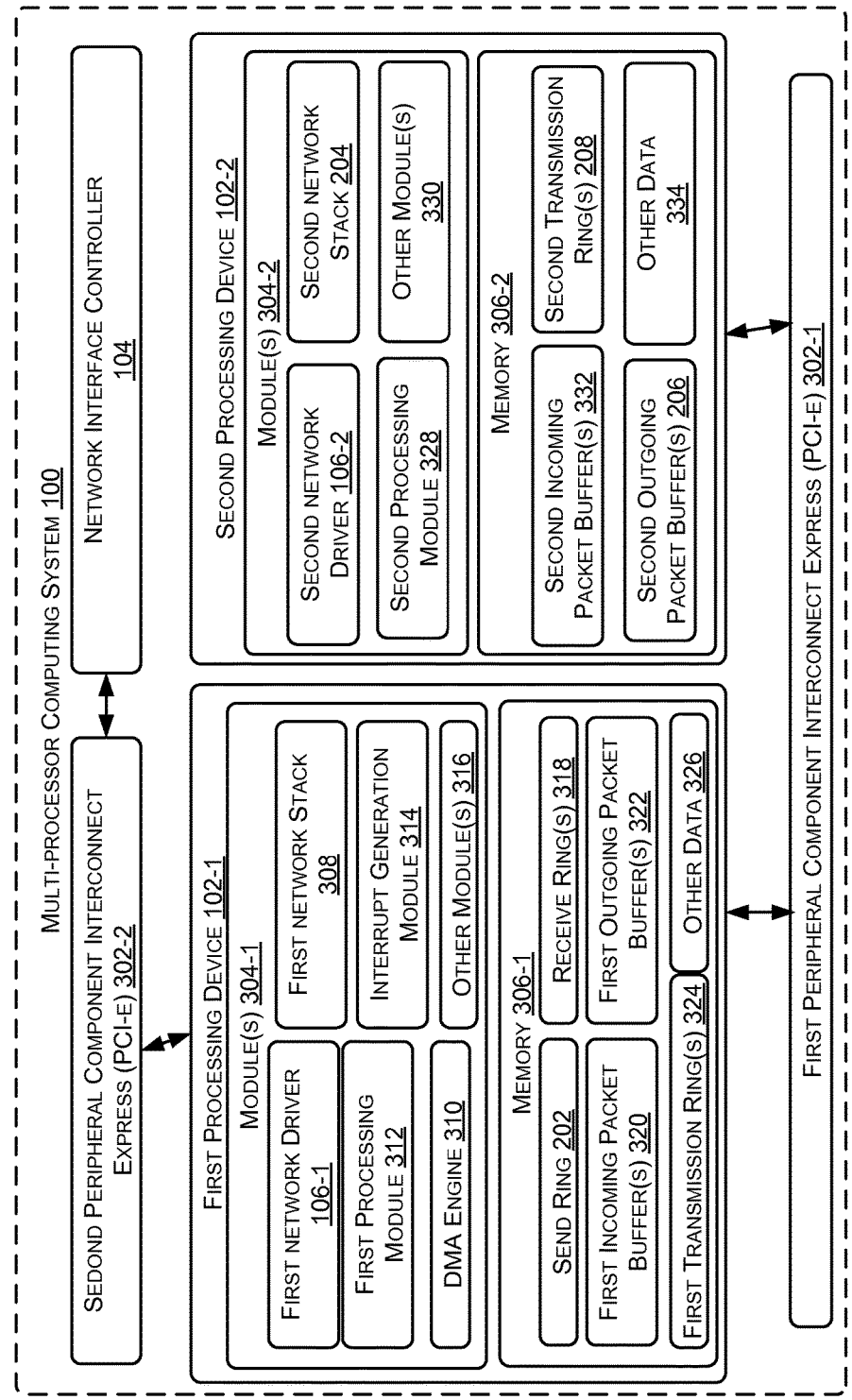
FIG. 3 illustrates various example components of a multi-processor computing system, according to an example of the present subject matter.

FIG. 3 illustrates various example components of the multi-processor computing system 100, according to an example of the present subject matter. As previously described, the multi-processor computing system 100 includes a plurality of processing devices 102 sharing the NIC 104. For the sake of brevity, and not as a limitation, FIG. 3 has been explained using the first processing device 102-1 and the second processing device 102-2. However, additional processing device 102 can be provided in the multi-processor computing system 100, with each processing device 102 exchanging the data packets with the NIC 104 in the same manner as the second processing device 102-2.

The mufti-processor computing system 100 further includes peripheral component interconnect express (PCI-e) units for communicatively coupling the processing devices 102 with each other and the NIC 104. For instance, the first processing device 102-1 and the second processing device 102-2 are coupled using a first PCI-e 302-1. The first processing device 102-1 is further coupled to the NIC 104 using a second PCI-e 302-2. The first PCI-e 302-1 and the second PCI-e 302-2 are hereinafter collectively referred to as the PCI-e 302, The PCI-e 302 facilitates communication and interaction between various components of the multi-processor computing system 100. For instance, the NIC 104 may access data packets stored on the first processing device 102-1 using the first PCI-e 302-1 and on the second processing device 102-2 using the first PCI-e 302-1 and the second PCI-e 302-2.

Further, each of the first processing device 102-1 and the second processing device 102-2 includes module(s) 304 and memory 306. For instance, the first processing device 102-1 includes module(s) 304-1 and memory 306-1. The second processing device 102-2 includes module(s) 304-2 and memory 306-2.

The memory 306-1 and 1306-2 is hereinafter collectively referred to as the memory 306. The memory 306 may include any non-transitory computer-readable medium known in the art including, for example, volatile memory, such as static random access memory (SRAM) and dynamic random access memory (DRAM), and/or non-volatile memory, such as read only memory (ROM), erasable programmable ROM, and flash memories.

The module(s) 304-1 and 304-2 are hereinafter collectively referred to as the module(s) 304. The module(s) 304, amongst other things, include routines, programs, objects, components, and data structures, which perform particular tasks or implement particular abstract data types. The module(s) 304 may also be implemented as, signal processor(s), state machine(s), logic circuitries, and/or any other device or component that manipulate signals based on operational instructions. Further, the module(s) 304 can be implemented by hardware, by computer-readable instructions executed by a processing unit, or by a combination thereof. Although, the module(s) 304 are shown external to the memory 306, the module(s) 304 may be residing in the memory 306.

The module(s) 304-1 of the first processing device 102-1 may include the first network driver 106-1, a first network stack 308, a direct memory access (DMA) engine 310, a first processing module 312, an interrupt generation module 314, and other module(s) 316. The other module(s) 316 may include programs or coded instructions that supplement applications and functions, for example, programs in an operating system of the first processing device 102-1. Further, the memory 306-1 may include the send ring 202, receive ring(s) 318, first incoming packet buffer(s) 320, first outgoing packet buffer(s) 322, first transmission ring(s) 324, and other data 326.

The module(s) 304-2 of the second processing device 102-2 may include the second network driver 106-2, the second network stack 204, a second processing module 328, and other module(s) 330. The other modules 330 may include programs or coded instructions that supplement applications and functions, for example, programs in an operating system of the second processing device 102-2. Further, the memory 306-2 may include second incoming packet buffer(s) 332, the second outgoing packet buffers 206, the first transmission ring(s) 324, and other data 334.

When the multi-processing computing system 100 boots up, the first network driver 106-1 configures a media access control (MAC) address for the NIC 104. In one example, the MAC address is predetermined and is known to the network drivers 106 of all the processing devices 102. The first network driver 106-1 further obtains an Internet Protocol (IP) address from a dynamic host configuration protocol (DHCP) server (not shown in the figure) of the communication network to which the mufti-processor computing system 100 is connected. The first network driver 106-1 then provides the IP address to the second network driver 106-2 of the second processing device 102-2. The MAC address and the IP address may be used by the first processing device 102-1 and the second processing device 102-2 for interacting with other computing systems over the communication network using the NIC 104. Using the same MAC address and IP address by the first processing device 102-1 and the second processing device 102-2 allows use of a single NIC as an NIC can generally use a single MAC address at a time for communicating with other devices.

As previously described, outgoing data packets generated by any of the processing devices 102 are saved in an internal memory, i.e., the memory 306 of the first processing device 102-1 and a pointer to the location of the data packets is shared with the NIC 104, through the first processing device 102-1. The NIC 104 subsequently obtains the data packet from the memory 306 of the corresponding processing device 102 and transmits it over the communication network. When incoming data packets are received by the NIC 104, the incoming data packets are saved in the memory 306-1 of the first processing device 102-1 and a pointer to the location of the incoming data packets is shared with the processing device 102 for which the incoming data packets are received.

In one example, the first network driver 106-1 and the second network driver 106-2 initially perform a handshake upon initialization of the multi-processor computing system 100. In one example, as apart of the handshake, the first network driver 106-1 shares a location of a receive ring, in the receive ring(s) 318, corresponding to the second processing device 102-2. As previously described, the location of the receive ring 318 may be used by the second network driver 106-2 to obtain pointers corresponding to the incoming data packets received for the second processing device 102-2.

Continuing with the handshake, the second network driver 106-2 shares a location of the second transmission ring(s) 208 with the first network driver 106-1. As previously described, the location of second transmission ring(s) 208 may be used by the first network driver 106-1 to obtain pointers corresponding to the outgoing data packets generated by the second processing device 102-2.

In operation, when the second processing device 102-2 has to exchange data with the other computing system over the communication network, an outgoing data packet is generated by the second processing module 328. The second processing module 328 may share the outgoing data packet with the second network stack 204 for further processing and transmission. The second network stack 204 may subsequently add a network packet header to the outgoing data packet and save the outgoing data packet in the second outgoing packet buffers 206. In one example, the second outgoing packet buffers 206 may include various packets buffers from which the second network stack 204 may select one packet buffer for saving the outgoing data packet. The second network stack 204 may further notify the second network driver 106-2 that the outgoing data packet has been saved in the second outgoing packet buffers 206.

In response to the notification, the second network driver 106-2 may save an outgoing buffer pointer in the second transmission ring(s) 208. In one example, the outgoing buffer pointer corresponds to the second outgoing packet buffers 206 in which the outgoing data packet has been saved. In other words, the outgoing buffer pointer indicates a location of the second outgoing packet buffers 206 in which the outgoing data packet has been saved. The second network driver 106-2 may further trigger an outgoing packet interrupt to notify the first processing device 102-1 that the outgoing data packet has been generated by the second processing device 102-2 for transmission. In one example, the second network driver 106-2 may request the interrupt generation module 314 of the first processing device 102-1 to generate the outgoing packet interrupt to notify the first processing device 102-1. The second network driver 106-2 may request the interrupt generation module 314 using the first PCI-e 302-1.

On receiving the outgoing packet interrupt, the first network driver 106-1 may invoke an obtain pointers task to access the second outgoing packet buffers 206. The first network driver 106-1 may access and inspect the second outgoing packet buffers 206 to confirm if any outgoing data packet has been generated by the second processing device 102-2. If the first network driver 106-1 finds that the outgoing data packet has been generated and saved in the second outgoing packet buffers 206, the first network driver 106-1 may confirm the presence of the outgoing data packet. The first network driver 106-1 may then access the second transmission ring(s) 208 to obtain the outgoing buffer pointer from the second transmission ring(s) 208. In one example, the first network driver 106-1 may move the outgoing buffer pointer from the second transmission ring(s) 208 to the send ring 202 in the first processing device 102-1.

The first network driver 106-1 may further trigger a transmit packet interrupt to notify the NIC 104 that the outgoing data packet is available for transmission. In one example, the first network driver 106-1 may generate the transmit packet interrupt. In another example, the first network driver 106-1 may request the interrupt generation module 314 to generate the transmit packet interrupt. In response to the transmit packet interrupt, the NIC 104 may obtain the outgoing buffer pointer from the send ring 202 and analyze the outgoing buffer pointer to determine the location of the outgoing data packets. In one example, the NIC 104 may analyze the outgoing buffer pointer to determine the processing device 102 which wants to have data packets transmitted, location of the memory of the processing device 102, and the location of outgoing packet buffers of the processing device 102. For instance, in the present case the NIC 104 may analyze the outgoing buffer pointer to determine that the outgoing data packet has been generated by the second processing device 102-2 and is saved in the second outgoing packet buffers 206 in the memory 306-2.

The NIC 104 may then copy the outgoing data packet from the second outgoing packet buffers 206 to a transmission queue of the NIC 104. In one example, the NIC 104 may use an NIC DMA engine (not shown in the figure) to copy the outgoing data packet. The NIC 104 may transmit the outgoing data packer to the other computing system with which the second processing device 102-2 wished to exchange the data packets. The NIC 104 may further transmit a transmission complete interrupt to the first processing device 102-1 to notify the transmission of the outgoing data packet. In response to the transmission complete interrupt, the first network driver 106-1 may notify the second processing device 102-2 to recycle the second outgoing packet buffers 206 used to save the outgoing data packet before transmission. The second network device 106-2 may subsequently recycle the second outgoing packet buffers 206 and add the second outgoing packet buffers 206 to the pool of buffers in the second outgoing packet buffers 206.

In one example, when the first processing device 102-1 has to exchange data with the other computing system over the communication network, another set of outgoing data packets is generated by the first processing module 312. The first processing module 312 may share the set of outgoing data packets with the first network stack 308 for further processing and transmission. The first network stack 308 may subsequently add a network packet header to the set of outgoing data packets and save the set of outgoing data packets in the first outgoing packet buffers 322. In one example, like the second outgoing packet buffers 206, the first outgoing packet buffers 322 may also include various packets buffers from which the first network stack 308 may select one packet buffer. The first network stack 308 may further notify the first network driver 106-1 that the set of outgoing data packets has been saved in the first outgoing packet buffer 322.

The first network driver 106-1 may then save another outgoing buffer pointer in the first transmission ring 324. The other outgoing buffer pointer corresponds to the first outgoing packet buffer 322 in which the set of outgoing data packets has been saved. The first network driver 106-1 may further invoke another obtain pointer task to obtain the other outgoing buffer pointer from the first transmission ring 324. The first network driver 106-1 may move the other outgoing buffer pointer from the first transmission ring 324 to the send ring 202. Further, the first network driver 106-1 may trigger another transmit packet interrupt to notify the NIC 104 that the outgoing data packet is available for transmission. As previously described, the first network driver 106-1 may either generate the transmit packet interrupt itself or request the interrupt generation module 314 to generate the transmit packet interrupt.

On receiving the transmit packet interrupt, the NIC 104 may obtain the other outgoing buffer pointer from the send ring 202 and analyze the outgoing buffer pointer to determine the location of the set of outgoing data packets. On determining that the set of outgoing data packets has been generated by the first processing device 102-1 and is saved in the first outgoing packet buffer 322 in the memory 306-1, the NIC 104 accesses the first outgoing packet buffer 322, The NIC 104 may copy the set of outgoing data packets from the second outgoing packet buffers 206 to the transmission queue of the NIC 104 for transmission to the other computing system. In one example, the NIC 104 may use the NIC DMA engine, of the NIC 104, to copy the outgoing data packet.

Subsequently, the NIC 104 may transmit the transmission complete interrupt to the first processing device 102-1 to notify the transmission of the set of outgoing data packets. The first network device 106-1, on receiving the transmission complete interrupt, may recycle the first outgoing packet buffer 322 and add the first outgoing packet buffer 322 to the pool of buffers in the first outgoing packet buffers 322.

In one example, when an incoming data packet is received by the NIC 104, from a computing system over the communication network, the NIC 104 saves the incoming data packet in the first incoming packet buffer(s) 320 of the first processing device 102-1. Further, the NIC 104 determines whether the incoming data packet is received for the first processing device 102-1 or the second processing device 102-2. In one example, the NIC 104 makes the determination based on predefined packet routing rules and parameters, for instance, TCP ports of the processing device 102 to which the incoming data packet is addressed.

The NIC 104 then moves an incoming buffer pointer to a receive ring, from among the receive ring(s) 318, corresponding to the processing device 102 for which the incoming data packet is received. In one example, the incoming buffer pointer indicates a location of the incoming data packets in the first incoming packet buffer(s) 320.

In case the incoming data packet is received for the second processing device 102-2, the NIC 104 moves the incoming buffer pointer to the receive ring, from among the receive ring(s) 318, corresponding to the second processing device 102-2. The NIC 104 further generates and transmits a receive packet interrupt to the first processing device 102-1 to notify the receipt of the incoming data packet. In one example, the receive packet interrupt is received by the first network driver 106-1 of the first processing device 102-1. The first network driver 106-1 accesses the receive ring(s) 318 to identify the processing device 102 for which the incoming data packet is received and stored by the NIC 104 in the first incoming packet buffer(s) 320. In one example, the first network driver 106-1 accesses the receive ring(s) 318 corresponding to each of the processing devices 102 to identify the receive ring(s) 318 in which the incoming buffer pointer has been saved by the NIC 104. On identifying the receive ring(s) 318, the first processing devices 102-1 may determine that the incoming data packet has been received for the corresponding processing device 102.

The first network driver 106-1 may subsequently transmit an interrupt generation command to the interrupt generation module 314. The interrupt generation module 314, in turn, may transmit an incoming packet interrupt to the second network driver 106-2 to notify the second network driver 106-2 that the incoming data packet has been received and saved in the first incoming packet buffer(s) 320.

On receiving the incoming packet interrupt, the second network driver 106-2 may invoke an obtain packet task to obtain the incoming buffer pointer from the receive ring(s) 318. The second network driver 106-2 may use the incoming buffer pointer to determine the location of the incoming data packets in the first incoming packet buffers 320. The second network driver 106-2 may further determine a destination packet buffer in the second incoming packet buffer 332 for copying the incoming data packet from the first incoming packet buffer(s) 320. The second network driver 106-2 may then allocate the destination packet buffer in the second incoming packet buffer 332 for storing the incoming data packet.

Further, the second network driver 106-2 may transmit an obtain packets signal to the DMA engine 310 of the first processing device 102-1 to instruct the DMA engine 310 to copy the incoming data packets from the first incoming packet buffer 320 to the destination packet buffer. In one example, the obtain packets signal may include the location of the incoming data packets in the first incoming packet buffers 320, Further, the second network driver 106-2 may transmit the obtain packets signal to the DMA engine 310 using the first PCI-e 302-1.

The DMA engine 310 may subsequently access the first incoming packet buffers 320 to obtain and copy the incoming data packet to the destination packet buffer in the second incoming packet buffers 332. The DMA engine 310 may further transmit a packet copy completion interrupt to the second network driver 106-2 to notify that the incoming data packet has been copied to the second incoming packet buffers 332. The second network driver 106-2 may then notify the second network stack 204 that the incoming data packet is available in the second incoming packet buffer 332. The second network stack 204 may obtain and render the incoming data packet to the second processing module 328 for further processing. Further, in one example, once the incoming data packet is rendered to the second processing module 328, the first network driver 106-1 may recycle the first incoming packet buffer 320 in which the incoming data packet was stored before being rendered to the second processing module 328.

In case the incoming data packet is received for the first processing device 102-1, the NIC 104 moves the incoming buffer pointer to another receive ring(s) 318 corresponding to the first processing device 102-1. The NIC 104 further generates and transmits the receive packet interrupt to the first processing device 102-1 to notify the receipt of the incoming data packet. On receiving the receive packet interrupt, the first network driver 106-1 accesses the receive ring(s) 318. As previously described, the first network driver 106-1 accesses the receive ring(s) 318 corresponding to each of the processing devices 102 to identify the receive ring(s) 318 in which the incoming buffer pointer has been saved by the NIC 104. On identifying that the incoming data packet has been received for the first processing device 102-1, the first network driver 106-1 may invoke another obtain packet task to obtain the incoming buffer pointer from the other receive ring. The first network driver 106-1 may use the incoming buffer pointer to determine the location of the incoming data packet in the first incoming packet buffer 320.

The first network driver 106-1 may subsequently notify the first network stack 308 that the incoming data packet is available in the first incoming packet buffer 320. The first network stack 308 may obtain and render the incoming data packet to the first processing module 312 for further processing. Further, in one example, once the incoming data packet is rendered to the first processing module 312, the first network driver 106-1 may recycle the first incoming packet buffer 320 in which the incoming data packet was stored before being rendered to the first processing module 312.

Figure 4:
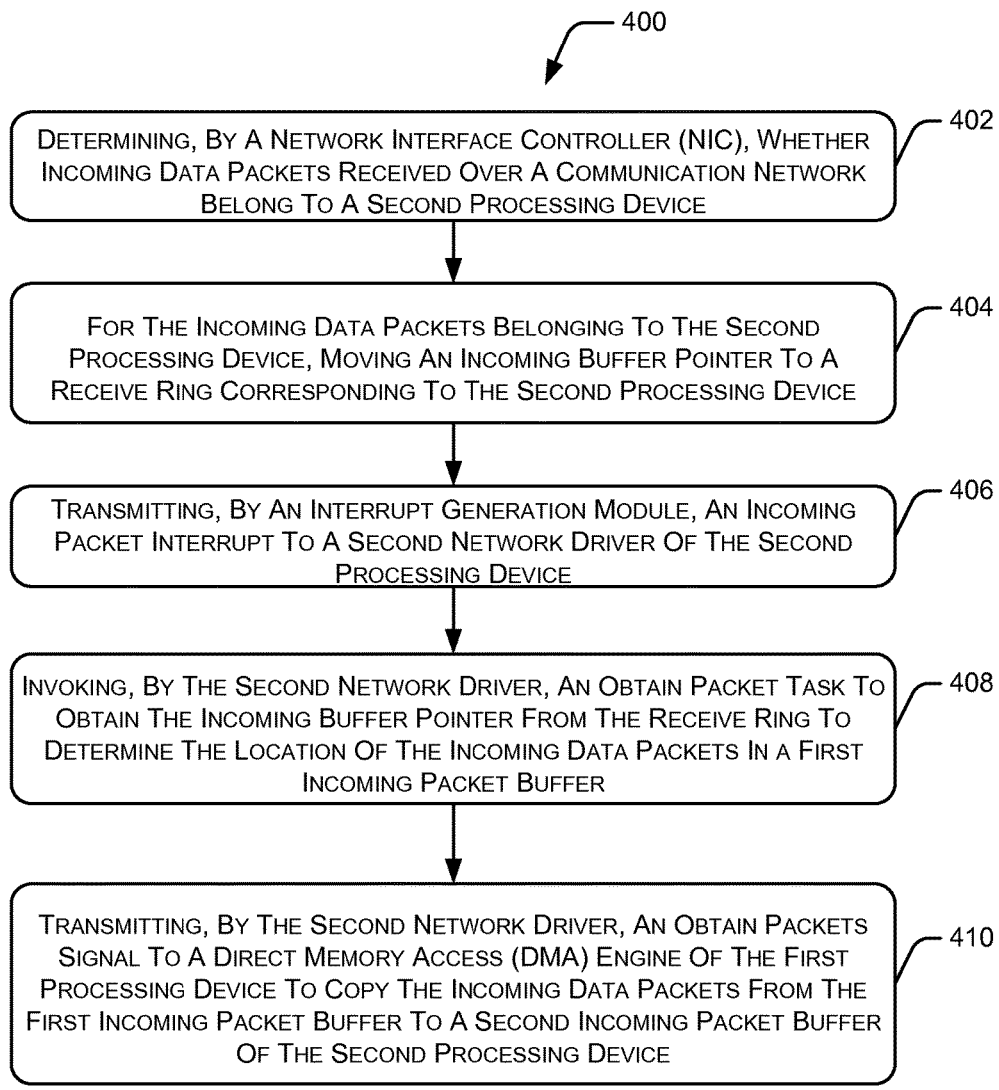
FIG. 4 illustrates an example data transmission method for sharing a network interface controller in multi-processor computing systems, according to an example of the present subject matter.
Figure 5:
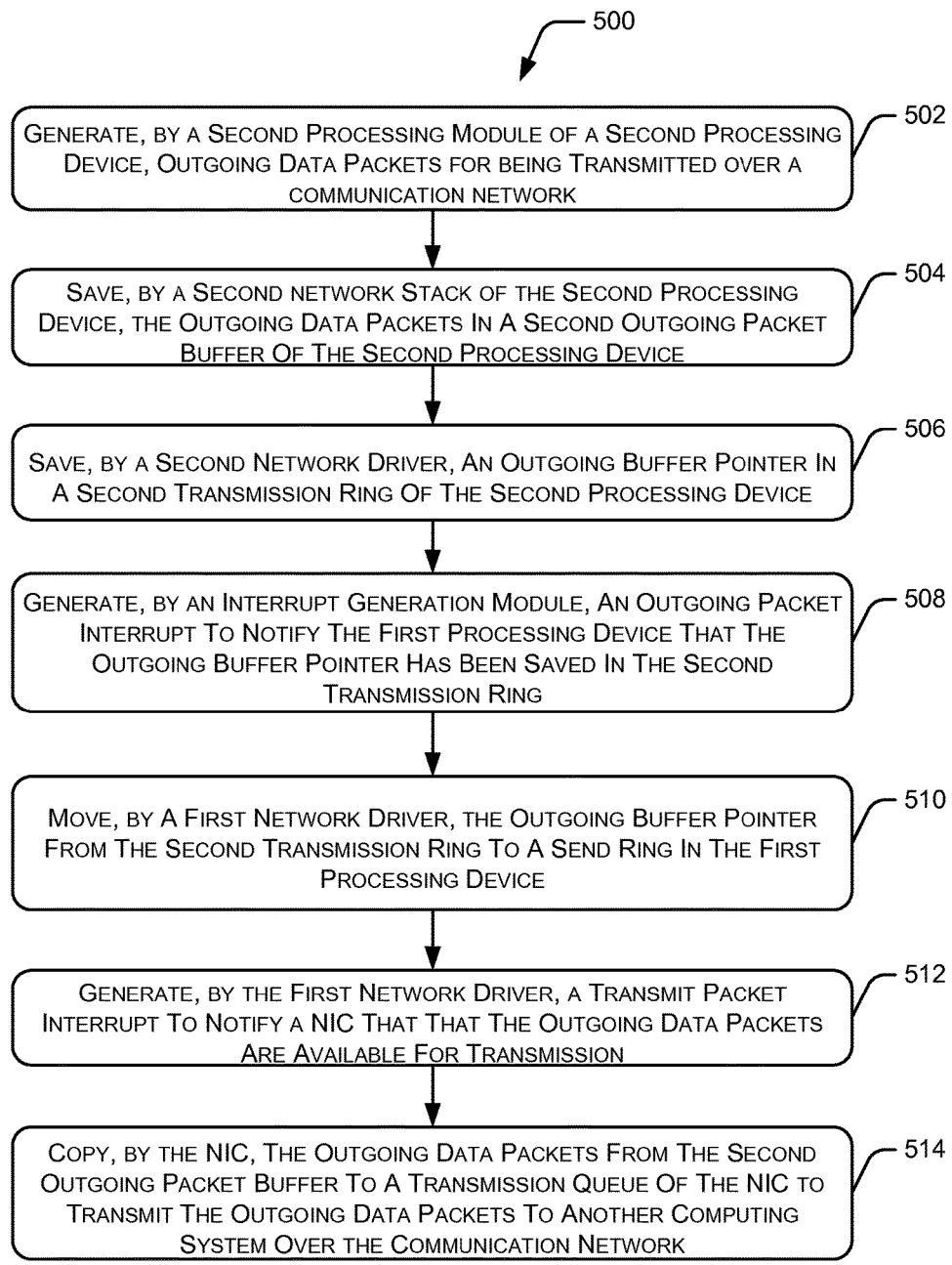
FIG. 5 illustrates an example data transmission method for sharing a network interface controller in multi-processor computing systems, according to an example of the present subject matter.

FIGS. 4 and 5 illustrate example methods 400 and 500, respectively, for data transmission, in accordance with an example of the present subject matter. The order in which the methods are described is not intended to be construed as a limitation, and any number of the described method blocks may be combined in any order to implement the aforementioned methods, or an alternative method. Furthermore, the methods 400 and 500 may be implemented by processing resource or computing device(s) through any suitable hardware, non-transitory machine readable instructions, or combination thereof.

It may also be understood that the methods 400 and 500 may be performed by processing device of multi-processing systems, such as the first processing device 102-1 and the second processing device 102-2 of the multi-processing system 100. Furthermore, the methods 400 and 500 may be executed based on instructions stored in a non-transitory computer readable medium, as will be readily understood. The non-transitory computer readable medium may include, for example, digital memories, magnetic storage media, such as one or more magnetic disks and magnetic tapes, hard drives, or optically readable digital data storage media.

Further, the methods 400 and 500 are described below with reference to the multi-processing system 100 as described above, other suitable systems for the execution of these methods can be utilized. Additionally, implementation of these methods is not limited to such examples.

Referring to FIG. 4, at block 402, a determination is made to ascertain whether incoming data packets received over a communication network belong to a second processing device of a multi-processor computing system. In one example, the incoming data packets may be received by a network interface controller (NIC) of the multi-processor computing system, such as the multi-processor computing system 100. The NIC may analyze the incoming data packets to determine whether the incoming data packets belong to a second processing device, such as the second processing device 102-2 of the multi-processor computing system 100.

At block 404, for the incoming data packets belonging to the second processing device, an incoming buffer pointer is moved to a receive ring corresponding to the second processing device. In one example, on determining that incoming data packets belong to the second processing device, the NIC may save the incoming data packets in a first incoming packet buffer of a first processing device of the multi-processor computing system. The NIC may then move the incoming buffer pointer to the receive ring, corresponding to the second processing device, in the first processing device. In one example, the incoming buffer pointer indicates a location of the incoming data packets in the first incoming packet buffer.

At block 406, an incoming packet interrupt is transmitted to a second network driver of the second processing device. In one example, the incoming packet interrupt is transmitted by an interrupt generation module of the first processing device of the multi-processor computing system. Upon saving the incoming buffer pointer in the first incoming packet buffer, the NIC notifies the first processing device. A first network driver of the first processing device then instructs the interrupt generation module to notify a second network driver of the second processing device. In response, the interrupt generation module transmits the incoming packet interrupt to the second network driver to notify that incoming data packets have been received for the second processing device.

At block 408, the second network driver invokes an obtain packet task to obtain the incoming buffer pointer from the receive ring. In one example, second network driver may obtain the incoming buffer pointer to determine the location of the incoming data packets in the first incoming packet buffer.

At block 410, the second network driver transmits an obtain packets signal to a direct memory access (DMA) engine of the first processing device. In one example, the second network driver instructs the DMA engine to copy the incoming data packets from the first incoming packet buffer to a second incoming packet buffer of the second processing device. The incoming data packets may be further processed by the second processing device.

Referring to FIG. 5, at block 502, outgoing data packets are generated for being transmitted over a communication network. In one example, the outgoing data packets are generated by a second processing module of a second processing device, such as the second processing device 106-2 of the multi-processor computing system 100. The outgoing data packets are being generated for being transmitted to another computing system over the communication network.

At block 504, the outgoing data packets are saved in a second outgoing packet buffer of the second processing device. In one example, the outgoing data packets are saved by a second network stack of the second processing device.

At block 506, an outgoing buffer pointer is saved in a second transmission ring of the second processing device. In one example, a second network driver of the second processing device saves outgoing buffer pointer saved in the transmission ring upon being notified by the second network stack about the generation of the outgoing data packets.

At block 508, an outgoing packet interrupt is generated to notify a first processing device that the outgoing buffer pointer has been saved in the transmission ring. In one example, upon saving the outgoing buffer pointer in the transmission ring, the second network driver may request an interrupt generation module of the first processing device about the generation of the outgoing data packets. The interrupt generation module, in response, may generate the outgoing packet interrupt to notify the first processing device.

At block 510, the outgoing buffer pointer is moved from the second transmission ring to a send ring in the first processing device. In one example, upon receiving the outgoing packet interrupt, a first network driver may invoke an obtain pointers task to access the second outgoing packet buffers to confirm presence of the outgoing data packet in the second outgoing packet buffers. Upon confirming the presence of the outgoing data packet, the first network driver may access the second transmission ring to obtain and move the outgoing buffer pointer to the send ring.

At block 512, a transmit packet interrupt is generated to notify a network interface controller (NIC) that the outgoing data packets are available for transmission. In one example, the first network driver may generate the transmit packet interrupt to notify the NIC 104 of the multi-processor computing system, such as the multi-processor computing system 100.

At block 514, the outgoing data packets are copied from the second outgoing packet buffer to a transmission queue of the NIC. In one example, the NIC 104 may copy the outgoing data packets for transmission to the other computing system over the communication network.

Although examples for the present disclosure have been described in language specific to structural features and/or methods, it should stood that the appended claims are not necessarily limited to the specific features or methods described. Rather, the specific features and methods are disclosed and explained as examples of the present disclosure.

What is claimed:

1. A multi-processor computing system comprising:
   a second processing device to generate outgoing data packets and comprising:
      a second network stack to save the outgoing data packets in a second outgoing packet buffer of the second processing device; and
      a second network driver to save an outgoing buffer pointer in a second transmission ring of the second processing device, the outgoing buffer pointer corresponding to the second outgoing packet buffer;
   a first processing device communicatively coupled to the second processing device, the first processing device comprising a first network driver to move the outgoing buffer pointer from the second transmission ring to a send ring in the first processing device; and
   a network interface controller (NIC) communicatively coupled to the first processing device to:
      obtain the outgoing buffer pointer from the send ring;
      copy, using the outgoing buffer pointer, the outgoing data packets from the second outgoing packet buffer to a transmission queue of the NIC; and
      transmit the outgoing data packets to another computing system over a communication network.

2. The multi-processor computing system as claimed in claim 1, wherein the first network driver further is to:
   invoke an obtain pointers task to access the second outgoing packet buffer;
   confirm presence of the outgoing data packets in the second outgoing packet buffer;
   obtain the outgoing buffer pointer from the second transmission ring of the second processing device;
   generate a transmit packet interrupt to notify the NIC that the outgoing data packets are available for transmission; and
   notify the second processing device to recycle the second outgoing packet buffer in response to receiving a transmission complete interrupt from the NIC.

3. The multi-processor computing system as claimed in claim 1, wherein the first processing device further comprises an interrupt generation module to generate an outgoing packet interrupt, at the request of the second network driver, to notify the first processing device that the outgoing buffer pointer has been saved in the second transmission ring of the second processing device.

4. The multi-processor computing system as claimed in claim 1, wherein the first processing device further comprises:
   a first network stack to save another set of outgoing data packets in a first outgoing packet buffer in the first processing device, the other set of outgoing data packets being generated by the first processing device; and
   the first network driver to:
      save another outgoing buffer pointer in the send ring in the first processing device, the outgoing buffer pointer corresponding to the other set of outgoing data packets saved in a first outgoing packet buffer of the first processing device;
      generate a transmit packet interrupt to notify the NIC that the other set of outgoing data packets are available for transmission; and
      recycle the first outgoing packet buffer in response to receiving a transmission complete interrupt from the NIC.

5. The multi-processor computing system as claimed in claim 1, wherein the first network driver further is to:
   configure a media access control (MAC) address for the NIC;
   obtain an Internet Protocol (IP) address from a dynamic host configuration protocol server of the communication network; and
   provide the IP address to the second processing device, wherein the MAC address and the IP address are used by the first processing device and the second processing device for interacting with the another computing system over the communication network using the NIC.

6. The multi-processor computing system as claimed in claim 1, wherein the first network driver and the second network driver further are to perform a handshake upon initialization of the multi-processor computing system, and wherein
   the first network driver is to share, with the second network driver, a location of a receive ring corresponding to the second network driver, the receive ring present in the first processing device; and
   the second network driver is to share a location of the second transmission ring with the first network driver.

7. The multi-processor computing system as claimed in claim 1, wherein the NIC is to:
   save an incoming data packet in a first incoming packet buffer of the first processing device;
   determine which processing device of the multi-processor system is to receive the incoming data packet; and
   move an incoming buffer pointer to a receive ring corresponding to the processing device that is to receive the incoming data packet.

8. The multi-processor computing system as claimed in claim 7, wherein the first network driver is to access the receive ring to identify which processing device is to receive the incoming data packet.

9. The multi-processor computing system as claimed in claim 8, wherein, when the incoming data packet is for the second processing device, the first network driver is to transmit an incoming packet interrupt to the second network driver indicating receipt of the incoming data packet.

10. The multi-processor computing system as claimed in claim 7, wherein, when the incoming data packet is for the second processing device, the first network driver is to transmit an incoming packet interrupt to the second network driver indicating receipt of the incoming data packet.

11. The multi-processor computing system as claimed in claim 1, the first processing device further comprising a direct memory access (DMA) engine to copy incoming data packets from a first incoming packet buffer of the first processing device to a second incoming packet buffer of the second processing device when the incoming data packets are for the second processing device.

12. A data transmission method comprising:
    determining whether incoming data packets received over a communication network belong to a second processing device of a multi-processor computing system;
    for the incoming data packets belonging to the second processing device, moving an incoming buffer pointer to a receive ring corresponding to the second processing device, wherein the incoming buffer pointer indicates a location of the incoming data packets in a first incoming packet buffer, the receive ring and the first incoming packet buffer being in a first processing device of the multi-processor computing system;
    transmitting, by an interrupt generation module of the first processing device of the multi-processor computing system, an incoming packet interrupt to a second network driver of the second processing device;
    invoking, by the second network driver, an obtain packet task to obtain the incoming buffer pointer from the receive ring to determine the location of the incoming data packets in the first incoming packet buffer, in response to the incoming packet interrupt; and
    transmitting, by the second network driver, an obtain packets signal to a direct memory access (DMA) engine of the first processing device to copy the incoming data packets from the first incoming packet buffer to a second incoming packet buffer of the second processing device for being processed by the second processing device.

13. The method as claimed in claim 12 further comprising:
    saving, by a network interface controller (NIC), the incoming data packets in the first incoming packet buffer; and
    transmitting, by the NIC, a receive packet interrupt to the first network driver to notify receipt of the incoming data packets.

14. The method as claimed in claim 13, further comprising:
    accessing, by the first network driver, receive rings corresponding to each processing device to identify a processing device for which the incoming data packets have been received, in response to the receive packet interrupt; and
    transmitting, by the first network driver, an interrupt generation command to the interrupt generation module.

15. The method as claimed in claim 12, further comprising allocating, by the second network driver, a destination packet buffer in the second incoming packet buffer for copying of the incoming data packets from the first incoming packet buffer.

16. The method as claimed in claim 12, further comprising:
    copying, by the DMA engine, the incoming data packets from the first incoming packet buffer to the second incoming packet buffer in response to the obtain packets signal;
    transmitting, by the DMA engine, a packet copy completion interrupt to the second network driver to notify that the incoming packet buffer have been copied to the second incoming packet buffer; and
    rendering, by a second network stack, the incoming data packets to a second processing module of the second processing device.

17. The method as claimed in claim 12, further comprising:
    for the incoming data packets belonging to the first processing device, transmitting the incoming buffer pointer to another receive ring corresponding to the first processing device;
    accessing, by a first network driver, receive rings corresponding to each processing device to identify a processing device for which the incoming data packets have been received, in response to a receive packet interrupt;
    invoking, by the first network driver, another obtain packet task to obtain the incoming buffer pointer from the other receive ring to determine the location of the incoming data packets in the first incoming packet buffer; and
    rendering, by a first network stack, the incoming data packets to a first processing module of the first processing device.

18. The method a claimed in claim 17, further comprising:
    for the incoming data packets belonging to the first processing device, recycling, by the first network driver, the first incoming packet buffer once the incoming data packets are rendered to the first processing module; and
    for the incoming data packets belonging to the second processing device, recycling, by the first network driver, the first incoming packet buffer once the incoming data packets are rendered to a second processing module.

19. A multi-processor computing system comprising:
    a network interface controller (NIC) to move an incoming buffer pointer to a receive ring corresponding to a processing device, from among a plurality of processing devices, for which an incoming data packet has been received, wherein the incoming buffer pointer indicates a location of incoming data packets in a first incoming packet buffer, the receive ring and the first incoming packet buffer being in a first processing device of the multi-processor computing system;
    the first processing device communicatively coupled to the NIC and other processing devices, the first processing device comprising a first network driver to:
        for the processing device being a second processing device, transmit an interrupt generation command to an interrupt generation module of the first processing device to notify receipt of the incoming data packets to the second processing device; and
        for the processing device being the first processing device, invoke an obtain packet task to obtain the incoming buffer pointer from the receive ring to determine the location of the incoming data packets in the first incoming packet buffer for obtaining the incoming data packets for being processed by the first processing device; and
    the second processing device communicatively coupled to the first processing device, the second processing device comprising a second network driver to:
        for the processing device being the second processing device, invoke another obtain packet task to obtain the incoming buffer pointer from the receive ring to determine the location of the incoming data packets in the first incoming packet buffer; and
        transmit an obtain packets signal to a direct memory access (DMA) engine of the first processing device to copy the incoming data packets from the first incoming packet buffer to a second incoming packet buffer of the second processing device for being processed by the second processing device.

20. The multi-processor computing system as claimed in claim 19, wherein the first processing device further comprises:
the interrupt generation module to transmit an incoming packet interrupt to the second processing driver to notify the second processing device that the incoming data packets have been received; and
the DMA engine to:
copy the incoming data packets from the first incoming packet buffer to the second incoming packet buffer in response to the obtain packets signal; and
transmit a packet copy completion interrupt to the second network driver to notify that the incoming packet buffer have been copied to the second incoming packet buffer.

* * * * *